(12) United States Patent
Shukla et al.

(10) Patent No.: US 11,855,258 B2
(45) Date of Patent: Dec. 26, 2023

(54) SECONDARY BATTERY CELL WITH SOLID POLYMER ELECTROLYTE

(71) Applicant: Cabot Microelectronics Corporation, Aurora, IL (US)

(72) Inventors: Deepak Shukla, Webster, NY (US); Gladys Rocio Montenegro Galindo, Webster, NY (US); Kevin M. Donovan, Bergen, NY (US); Zichao Yang, King of Prussia, PA (US)

(73) Assignee: CMC MATERIALS, INC., Aurora, IL (US)

( * ) Notice: Subject to any disclaimer, the term of this patent is extended or adjusted under 35 U.S.C. 154(b) by 757 days.

(21) Appl. No.: 16/895,769

(22) Filed: Jun. 8, 2020

(65) Prior Publication Data

US 2021/0384553 A1    Dec. 9, 2021

(51) Int. Cl.
*H01M 10/0565* (2010.01)
*H01M 10/058* (2010.01)
*H01M 10/0525* (2010.01)

(52) U.S. Cl.
CPC ..... *H01M 10/0565* (2013.01); *H01M 10/058* (2013.01); *H01M 10/0525* (2013.01); *H01M 2300/0082* (2013.01)

(58) Field of Classification Search
CPC ......... H01M 10/0565; H01M 10/0525; H01M 10/058; H01M 2300/0082; Y02P 70/50; Y02E 60/10
USPC ........................................ 429/303
See application file for complete search history.

(56) References Cited

U.S. PATENT DOCUMENTS

| | | | |
|---|---|---|---|
| 5,837,752 | A | 11/1998 | Shastri et al. |
| 6,001,509 | A | 12/1999 | Kim et al. |
| 6,124,060 | A | 9/2000 | Akita et al. |
| 6,524,498 | B1 | 2/2003 | Hata et al. |
| 7,077,983 | B2 | 7/2006 | Sandi-Tapia et al. |

(Continued)

FOREIGN PATENT DOCUMENTS

| | | |
|---|---|---|
| EP | 3309867 A1 | 4/2018 |
| WO | 0117051 A1 | 3/2001 |

OTHER PUBLICATIONS

Taiwan Intellectual Property Office, Search Report issued in connection with Taiwan Patent Application No. 110120549 dated Nov. 15, 2021.

(Continued)

*Primary Examiner* — Gary D Harris

(57) ABSTRACT

A secondary battery cell includes a cathode of a first electrode material, an anode of a second electrode material, and a solid polymer electrolyte layer disposed between the cathode and anode. The solid polymer electrolyte includes a first surface in contact with the cathode and a second surface in contact with the anode. The solid polymer electrolyte layer includes a cellulosic polymer matrix. The cellulosic polymer matrix includes a network of the cellulosic polymer. Lithium ions are dispersed in the cellulosic polymer matrix. Ceramic particles are dispersed in the cellulosic polymer matrix. The ceramic particles include a metal oxide. One or more plasticizers are dispersed in the cellulosic polymer matrix. One or more polymer networks are in contact with the cellulosic polymer matrix. The one or more polymer networks include an acrylate-containing polymer.

6 Claims, 4 Drawing Sheets

(56) References Cited

U.S. PATENT DOCUMENTS

| | | |
|---|---|---|
| 8,119,273 B1 | 2/2012 | Gerald, II et al. |
| 2002/0009649 A1 | 1/2002 | Sato et al. |
| 2002/0102464 A1 | 8/2002 | Yoshida et al. |
| 2010/0203383 A1 | 8/2010 | Weppner |
| 2016/0049690 A1 | 2/2016 | Basak et al. |
| 2018/0145370 A1 | 5/2018 | Buisine et al. |
| 2020/0112050 A1* | 4/2020 | Hu .................... H01M 10/0525 |

OTHER PUBLICATIONS

A. Manuel Stephan et al., Polymer 47 (2006) 5952-5964.
Jonas Mindemark et al., Progress in Polymer Science 81 (2018) 114-143.
Liping Yue et al., Energy StorageMaterials5 (2016)139-164.
Mariano Grünebaum et al., Progress in Solid State Chemistry 42 (2014) 85e105.
Qing Zhao et al., Nature Energy | vol. 4 | May 2019 | 365-373 | www.nature.com/natureenergy.
T Sudiarti et al., 2017 IOP Conf. Ser.: Mater. Sci. Eng. 223 012052.

* cited by examiner the # SECONDARY BATTERY CELL WITH SOLID POLYMER ELECTROLYTE

TECHNICAL FIELD

This disclosure generally relates to electrodes, and more specifically to a secondary battery cell with solid polymer electrolyte.

BACKGROUND

Secondary energy cells, such as those used in rechargeable batteries, facilitate repeated draining and recharging of electrical energy. In a secondary battery or cell, chemical reactions that facilitate energy storage at the positive and negative electrodes are reversible. Electrodes of secondary batteries or cells are capable of being regenerated (i.e., recharged) multiple times by the application of an electrical charge thereto.

SUMMARY

In an embodiment, a solid polymer electrolyte precursor composition includes (i) one or more organic solvents; (ii) one or more cellulosic polymers dissolved in the one or more organic solvents; (iii) one or more polymerizable components dissolved or dispersed in the one or more organic solvents; (iv) one or more photo-initiators dissolved or dispersed in the one or more organic solvents, where at least one of the one or more photo-initiators, following irradiation with light, promotes polymerization of at least one of the one or more polymerizable components; (v) one or more lithium ion sources dissolved or dispersed in the one or more organic solvents, where each lithium ion source includes a lithium ion salt or a lithium ion complex; (vi) one or more plasticizers dissolved or dispersed in the one or more organic solvents; and (vii) one or more ceramic particles dissolved or dispersed in the one or more organic solvents, where the ceramic particles include a metal oxide.

In another embodiment, a method of preparing a solid polymer electrolyte precursor composition includes dissolving one or more cellulosic polymers in one or more organic solvents, thereby preparing a polymer-in-solvent solution. One or more polymerizable components are combined with the polymer-in-solvent solution. One or more photo-initiators are combined with the polymer-in-solvent solution, where at least one of the one or more photo-initiators, following irradiation with light, promotes polymerization of at least one of the one or more polymerizable components. One or more lithium ion sources are combined with the polymer-in-solvent solution. Each lithium ion source includes a lithium ion salt or a lithium ion complex. One or more plasticizers are combined with the polymer-in-solvent solution. One or more ceramic particles are combined with the polymer-in-solvent solution. The ceramic particles include a metal oxide.

In yet another embodiment, a secondary battery cell includes a cathode of a first electrode material, an anode of a second electrode material, and a solid polymer electrolyte layer disposed between the cathode and anode. The solid polymer electrolyte includes a first surface in contact with the cathode and a second surface in contact with the anode. The solid polymer electrolyte layer includes a cellulosic polymer matrix. The cellulosic polymer matrix includes a network of the cellulosic polymer. Lithium ions are dispersed in the cellulosic polymer matrix. Ceramic particles are dispersed in the cellulosic polymer matrix. The ceramic particles include a metal oxide. One or more plasticizers are dispersed in the cellulosic polymer matrix. One or more polymer networks are in contact with (e.g., extend at least partially into the network of) the cellulosic polymer matrix. The one or more polymer networks include an acrylate-containing polymer.

In yet another embodiment, a method of preparing a semi-interpenetrating polymer network solid polymer electrolyte includes preparing a precursor. The precursor is prepared by combining one or more cellulosic polymers with one or more organic solvents. One or more polymerizable components are combined with the one or more organic solvents. One or more photo-initiators are combined with the one or more organic solvents. At least one of the one or more photo-initiators, following irradiation with light, promotes polymerization of at least one of the one or more polymerizable components. One or more lithium ion sources are combined with the one or more organic solvents. Each lithium ion source includes a lithium ion salt or a lithium ion complex. One or more plasticizers are combined with the one or more organic solvents. One or more ceramic particles are combined with the one or more organic solvents. The ceramic particles include a metal oxide. At least a portion of the precursor is applied to a surface of a substrate. The applied precursor is exposed to (e.g., irradiated with) light.

Most secondary batteries employ liquid electrolytes to facilitate charge transfer between anode and cathode. However, such electrolytes have several disadvantages. For example, liquid electrolytes may be toxic and/or flammable, such that leakage of electrolytes can result in considerable harm. Some alternative electrolytes have been in development. However, these electrolyte materials are generally unsuitable for many applications because of poor mechanical stability and/or low ionic conductivity at room temperature. Adding ceramic particles is insufficient for increasing conductivity.

This disclosure recognizes that a material used as both a separator and electrolyte between electrodes in an electrochemical cell should include the following properties: (1) chemical compatibility with the electrode materials used in the cell; (2) a sufficient mechanical strength to withstand the rigors of manufacturing and use; (3) the ability to be prepared at an appropriate thickness (e.g., thin materials may be desirable to minimize ion transport distance and maximize ion transport rate); and (4) a high ionic conductivity at room temperature. The unique semi-interpenetrating polymer network solid polymer electrolyte (semi-IPN SPE) and associated precursor compositions described in this disclosure solve problems of the previous technology and provide the desired properties identified above.

The semi-IPN SPE described in this disclosure provides an ionic conductivity of, or approaching, $10^{-3}$ Siemens per centimeter (S/cm) at room temperature and thus can be used in place of previous liquid electrolytes. The semi-IPN SPE has a high thermal stability, which facilitates the production of secondary cells with simplified casing modules and cooling systems, thereby decreasing the weight and volume of batteries containing such cells and increasing the energy density of such batteries. A plurality of cells prepared as described in this disclosure can be combined (e.g., stacked) in a single unit, facilitating the preparation of batteries with large capacities and/or which provide high voltages. The preparation processes described in this disclosure are compatible with high-throughput approaches, such as roll-to-roll fabrication. These preparation processes can also proceed at relatively low temperatures, resulting in cost savings and improved safety compared to previous electrolyte preparation strategies. The semi-IPN SPE has a high electrochemical stability and is suitable for high voltage applications (e.g., portable power tools, electronic vehicles, etc.). For example, the semi-IPN SPE described in this disclosure may provide a wide electrochemical window (e.g., up to 5 V or more), which facilitates the use of high voltage electrode materials.

Certain embodiments may include none, some, or all of the above technical advantages. One or more other technical advantages may be readily apparent to one skilled in the art from the figures, descriptions, and claims included herein.

BRIEF DESCRIPTION OF FIGURES

To assist in understanding the present disclosure, reference is now made to the following description taken in conjunction with the accompanying drawings, in which.

DETAILED DESCRIPTION

Figure 1:
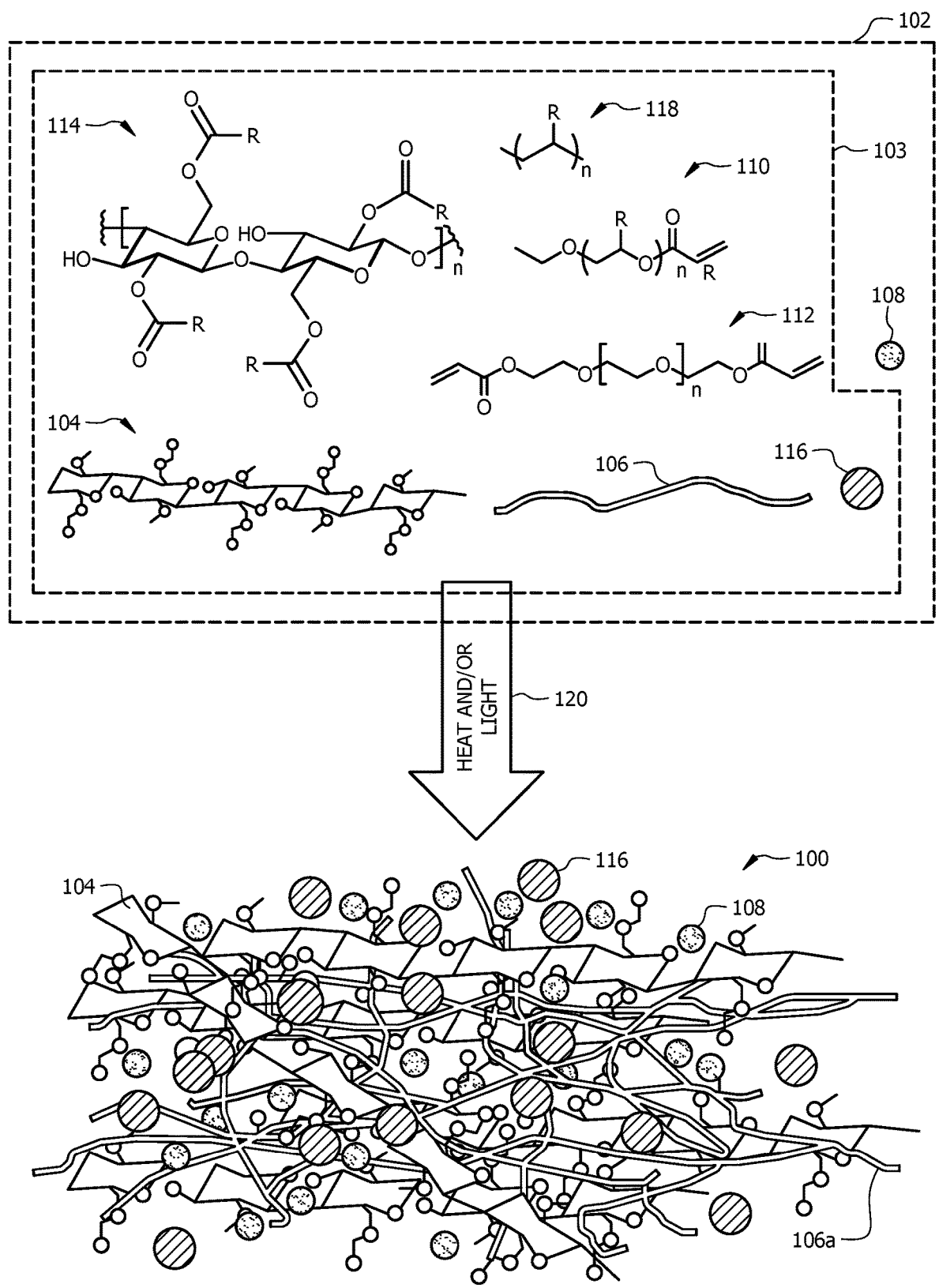
FIG. 1 is a diagram illustrating a precursor composition for preparing a semi-interpenetrating network solid polymer electrolyte film, according to illustrative embodiments of the present disclosure.

It should be understood at the outset that, although example implementations of embodiments of the disclosure are illustrated below, the present disclosure may be implemented using any number of techniques, whether currently known or not. The present disclosure should in no way be limited to the example implementations, drawings, and techniques illustrated below. Additionally, the drawings are not necessarily drawn to scale.

As described above, recent advances in portable electronic devices have been accompanied by increased demand for rechargeable batteries with improved properties (e.g., lower cost, increased energy density, improved safety, etc.). Lithium-metal and lithium-ion secondary cells typically have an increased electrical energy storage capacity, or energy density, compared to that of other cell types (e.g., nickel-metal hydride). For convenience, the terms "lithium secondary cells" and "lithium cells" are used herein to refer to both lithium-metal and lithium-ion type batteries and secondary cells.

Previous lithium secondary cells may include a porous dielectric separator, or diaphragm, interposed between the electrodes of the cell and a liquid electrolyte which provides ionic conductivity such that charge can be transferred between the electrodes. The liquid electrolytes commonly employed in lithium cells generally provide an acceptable ionic conductivity for adequate cell performance. However, the use of liquid electrolytes is associated with several disadvantages. For instance, liquid electrolytes are subject to leakage from the cells in which they are sealed. These electrolytes can include hazardous materials. Therefore, leakage can result not only in decreased cell performance (i.e., due to loss of ionic conductivity) but also in harm to people and/or the environment. Cells which employ liquid electrolytes also tend to have more stringent size constraints, such that cells with liquid electrolyte tend to be larger than may be desired or in a shape that is impractical for a given purpose. Other previous electrolytes generally lack the appropriate combination of electrical and mechanical properties needed for many battery applications (e.g., portable electronics, portable power tools, satellite technology, electric vehicles, etc.). For example, previous alternatives to liquid electrolytes generally lacked a sufficiently large ionic conductance and/or adequate mechanical strength for reliable performance in most applications.

The unconventional semi-interpenetrating polymer network solid polymer electrolyte (semi-IPN SPE) described in this disclosure provides solutions to the technical problems of previous electrolytes including those described above by providing an electrolyte that is safer than liquid electrolytes and has an adequate mechanical strength and ionic conductivity for modern applications. An exemplary advantage of the compositions and methods described in this disclosure may stem, at least in part, from unexpected synergistic effects of components included in the semi-IPN SPE precursor. Cellulosic polymers, which are used to form a polymer matrix in the semi-IPN SPE, effectively solubilize lithium ions because of the abundance of oxygen atoms in each saccharide unit of the cellulosic polymers. However, the mechanical properties (e.g., strength and stability) of a film prepared from such a cellulosic matrix may be decreased by the addition of lithium ions. In an exemplary embodiment, to achieve desired mechanical properties, another polymer network may be appropriately combined with the cellulosic polymer matrix as described herein to increase the mechanical strength and stability of the solid polymer electrolyte prepared from these materials. In another exemplary embodiment, the addition of ceramic particles not only improves the mechanical properties of the semi-IPN SPE but also provides an increase in the ionic conductivities of the semi-IPN SPEs. Improvements to ionic conductivity may be achieved using the processes described in this disclosure where ceramic particles are maintained in a well-dispersed state prior to preparation of a semi-IPN SPE film. For example, a stable cellulosic slurry may be prepared in which the ceramic particles remain well (e.g., homogeneously) dispersed prior to formation of the semi-IPN SPE.

Semi-IPN Solid Polymer Electrolyte

FIG. 1 illustrates an example semi-IPN solid polymer electrolyte 100. The electrolyte 100 is generally prepared from a precursor 102 which includes (a) one or more polymers 104 (e.g., such as one or more cellulosic polymers); (b) one or more photochemically or thermally polymerizable components 106; (c) one or more lithium ion source 108 (e.g., one or more lithium salts and/or lithium complexes); (d) one or more organic solvents 110; (e) one or more plasticizers 112; (f) one or more photo-initiators 114; and (g) one or more metal oxide nanoparticles 116. In some embodiments, the precursor 102 may further include a low molecular weight vinylic backbone polymer 118. Examples of the various components 104, 106, 108, 110, 112, 114, 116, 118, of the precursor 102 are described in greater detail below. While illustrative examples are described below for the various components 104, 106, 108, 110, 112, 114, 116, 118, it should be understood that other possible such components 104, 106, 108, 110, 112, 114, 116, 118 would be readily apparent to one skilled in the art in view of present disclosure.

As described in greater detail below with respect to FIG. 3, a subset 103 of the components (i.e., subset 103 includes one or more of components 104, 106, 110, 112, 114, 116, and/or 118) of the precursor 102 may initially be combined (e.g., via mixing under suitable conditions). For example, the components of the subset 103 may be mixed under predetermined conditions (e.g., at room temperature) such that thermochemical reactions (e.g., thermal reduction) do not proceed prematurely to an appreciable extent. In some embodiments, the subset 103 includes all but the lithium ion source(s) 108 of the precursor 102. The subset 103 of components may be prepared as a "premixed" solution, and the lithium ion source(s) 108 (e.g., lithium salt(s) and/or complex(es)) can be subsequently added to the premixed solution in a controlled fashion at room temperature or under appropriate heating. The resulting precursor 102 may be applied to a substrate and heated and/or exposed to light 120, as illustrated in FIG. 1 to generate a semi-IPN SPE 100 film (e.g., a thin film). Example methods for preparing semi-IPN SPE 100 films are described in greater detail below with respect to FIG. 3.

TABLE 1 below illustrates an example composition of the precursor 102. The precursor 102 includes components 104, 106, 108, 112, 114, 116, and optionally 118 dissolved and/or dispersed in the liquid solvent(s) 110. Exemplary ranges of the amounts of each component 104, 106, 108, 110, 112, 114, 116, 118 included in the precursor are shown in TABLE 1. In an example embodiment, the precursor 102 includes 41% cellulose acetate propionate (CAP) (i.e., polymer 104), 11% polyethylene glycol (200) diacrylate (SR 259) and 6% alkoxylated pentaerythritol tetraacrylate (SR 494) (i.e., acrylic monomers as polymerizable component(s) 106), 19% lithium iodide (i.e., lithium ion source 108), 6% polycaprolactone triol (i.e., plasticizer 112), and 17% titanium dioxide particles (i.e., ceramic particles 116) dissolved and/or dispersed in the one or more solvents 110.

TABLE 1

Example composition of precursor 102.

| Component | Weight % (mass of component per total mass of precursor 102) |
| --- | --- |
| polymer(s) 104 | 1-50 |
| polymerizable component(s) 106 | 1-50 |
| lithium-ion source 108 | 1-60 |
| Solvent(s) 110 | 50-95 |
| plasticizer(s) 112 | 0.1-10 |
| photo-initiator(s) 114 | 0.1-10 |
| ceramic particles 116 | 1-25 |
| vinylic backbone polymer(s) 118 | 1-10 |

As described above and in greater detail below with respect to FIG. 3, the semi-IPN SPE 100 may be prepared on a substrate as a thin film (e.g., with a thickness of several to tens of micrometers). The relative quantities of components in the precursor 102 may be selected to facilitate not only improved mechanical and electrical properties in the resulting semi-IPN SPE 100 but also to allow for reliable and efficient thin-film processing. For example, the solid polymer electrolyte precursor 102 may include at least 5% solids (e.g., all components other than solvent(s) 110) and up to and including 90% solids. In some embodiments, the precursor 102 includes at least 15% solids and up to and including 50% solids. In some embodiments, the total amount of solids and organic solvent(s) 110 may be selected to adjust the viscosity of the precursor 102 for a particular deposition method (e.g., to prepare a thin film of the precursor 102). For example, the precursor 102 may be a mixture with a viscosity of at least 1 centipoise (cP) and up to and including 5,000 cP. In some embodiments, the viscosity of the precursor 102 is at least 3 cP and up to and including 50 cP. The example viscosity values described above are all measured at about 25° C.

The semi-IPN SPE 100 generally includes one or more cellulosic polymer networks (i.e., network(s) of the polymer(s) 104), as illustrated in FIG. 1. The semi-IPN SPE 100 also includes one or more linear or branched polymers 106a (i.e., polymers generated via polymerization of the polymerizable component(s) 106, which may be promoted by photo-initiator(s) 114 following exposure to light) that "penetrate" or extend at least partially into one of the polymer networks on a molecular scale. In some embodiments, a semi-IPN SPE 100 film includes 25-60 weight % of the one or more polymer(s) 104, 10-25 weight % of polymerizable component(s) 106 (and/or polymers 106a derived therefrom), 20-35 weight % lithium source(s) 108, 1-10 weight % of plasticizer(s) 112, 0.1-5 weight % of photo-initiator(s) 114 (and/or byproducts derived therefrom), and 10-25 weight % of the ceramic particles 116. The weight % values provided above are based on the total mass of components 104, 106, 108, 112, 114, and 116 in the semi-IPN SPE 100. The semi-IPN SPE 100 may be a thin film (e.g., with a thickness of less than 500 micrometers). In some embodiments, the semi-IPN SPE 100 has a thickness of less than 150 micrometers. In some embodiments, the semi-IPN SPE 100 has a thickness of less than 100 micrometers. In some embodiments, the semi-IPN SPE 100 has a thickness in a range from about 10 micrometers to less than 100 micrometers. The ionic conductivity of the semi-IPN SPE 100 may be greater than or equal to $1\times10^{-4}$ S/cm. In some embodiments, the ionic conductivity is greater than or equal to $5\times10^{-4}$ S/cm. In some embodiments, the ionic conductivity is greater than or equal to $1\times10^{-3}$ S/cm.

Figure 2:
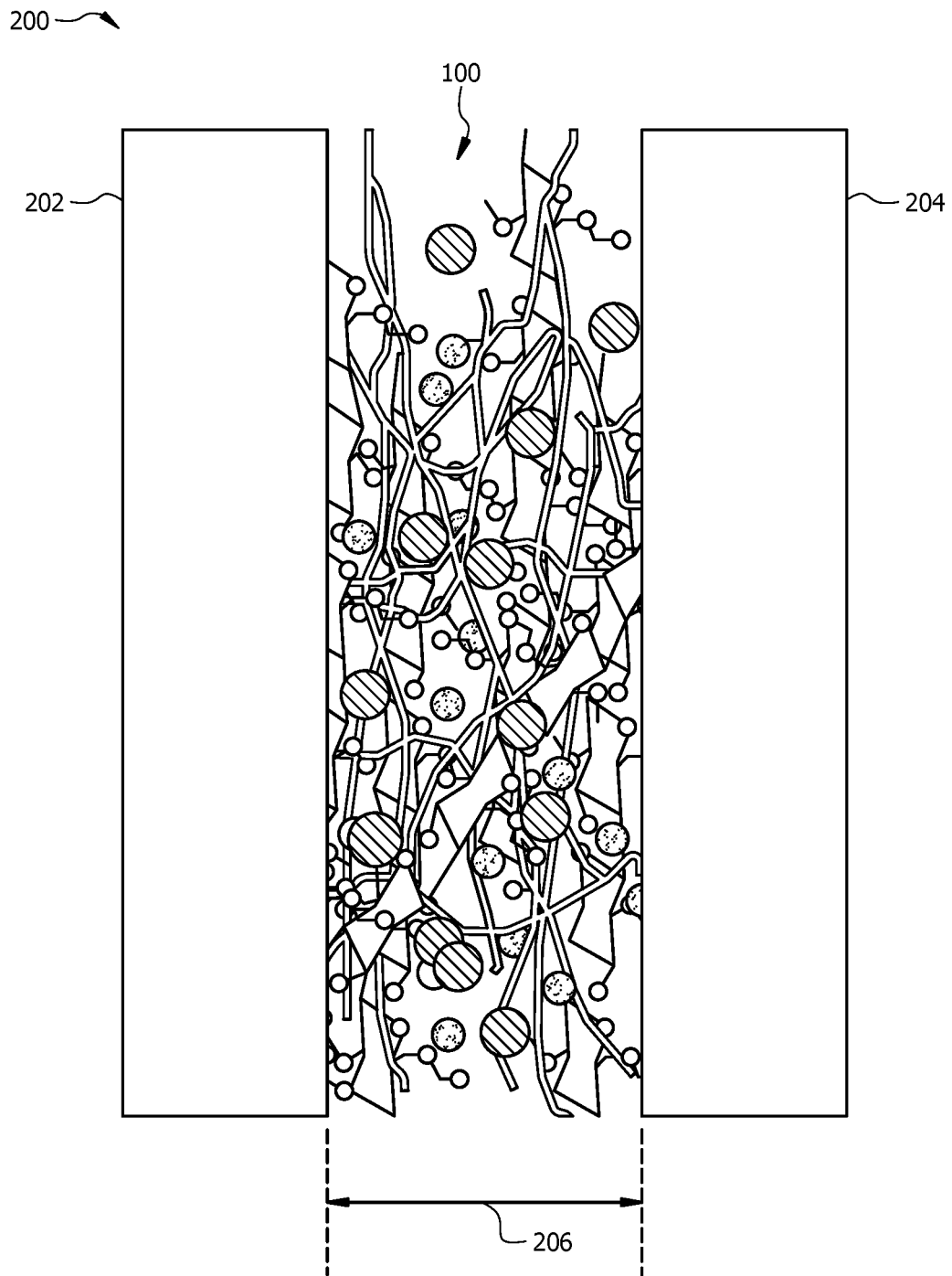
FIG. 2 is a diagram of an example cell prepared using the solid polymer electrolyte film of FIG. 1.

FIG. 2 illustrates an example lithium cell 200 (e.g., a secondary cell or battery) prepared using the semi-IPN SPE 100 of FIG. 1. The cell 200 includes a first electrode 202 and a second electrode 204 separated by the SPE 100. The first and second electrodes 202, 204 may be any appropriate electrode materials for use in a secondary cell or battery. For example, the first electrode 202 may be configured to act as a cathode (i.e., positive electrode) and may be any appropriate cathode material, such as lithium, lithium cobalt oxide, lithium iron phosphate, lithium manganese oxide, or the like. The second electrode 204 may be configured to act as the anode (i.e., negative electrode) and may be any appropriate anode material, such as lithium, graphite, a graphite-containing material, a silicon-containing material, or the like. The semi-IPN may have a thickness 206 of less than 200 micrometers. In some embodiments, the semi-IPN SPE 100 has a thickness 206 of less than 150 micrometers. In some embodiments, the semi-IPN SPE 100 has a thickness 206 of less than 100 micrometers. In some embodiments, the semi-IPN SPE 100 has a thickness 206 in a range from about 10 micrometers to less than 100 micrometers.

Example Polymers 104

In some embodiments, the one or more polymers 104 of the electrolyte precursor 102 include one or more cellulosic polymers. For instance, the polymer(s) 104 may include one or more cellulosic ester polymers. The polymer(s) 104 may be organic polymers. A single polymer 104 may be employed in the precursor 102. However, in some embodiments, a mixture of polymers 104 is used. When the precursor 102 includes multiple different polymers 104, the two or more different polymers 104 may be present in the same amount or in different amounts. In some embodiments, the polymer(s) 104 include one or both of one or more cellulose esters and one or more cellulose acetate polymers. In some embodiments, the polymer(s) 104 include a modified cellulose ester that was formed by modifying an initial cellulose ester with at least one of the plasticizer(s) 112.

Examples of polymer(s) 104 include, but are not limited to, cellulose acetate, cellulose acetate phthalate, cellulose acetate butyrate, cellulose acetate propionate, cellulose propionate, cellulose butyrate, cellulose acetate trimellitate, hydroxypropylmethyl cellulose phthalate, methyl cellulose, ethyl cellulose, hydroxyethyl cellulose, hydroxypropylmethyl cellulose, carboxymethyl cellulose, and mixtures of two or more of these. In some embodiments, the polymer(s) 104 are limited to one or more of carboxymethyl cellulose, cellulose acetate butyrate, cellulose acetate propionate, cellulose propionate, and cellulose acetate.

In some embodiments, the polymer(s) 104 include cellulosic polymers such as cellulose esters with free hydroxy groups directly attached to the polymer backbone to provide a free hydroxyl content in an amount of at least 1%, or at least 2%, and up to and including 5%, based on the total hydroxy groups that are present in the polymer 104. Remaining hydroxy groups in the polymer 104 may be esterified such that there is relatively low free hydroxyl content.

In a composition of the precursor 102, the polymer(s) 104 may be present in the precursor 102 at least 1 weight % and up to and including 50 weight % (where weight % is based on the total weight of components 104, 106, 108, 110, 112, 114, 116, 118 of the precursor 102). In some embodiments, the polymer(s) 104 may be present in the precursor 102 in an amount of at least 2 weight % and up to and including 15 weight %. In some embodiments, the polymer(s) 104 may be present in the precursor 102 in an amount of at least 3 weight % and up to and including 10 weight %.

Example Polymerizable Component(s) 106

The polymerizable component(s) 106 generally include one or more relatively small molecules (e.g., monomers, oligomers, or the like) that may be combined to form a larger molecule (e.g., a macromolecule or polymer). The polymerizable component(s) 106 may include one or more photochemically polymerizable materials. The term "photochemically polymerizable" components is used herein to refer to molecules which may be combined, for example, via covalent bonding following exposure to light (e.g., of a particular wavelength range and/or intensity) to form a larger molecule. For example, a "photochemically polymerizable" component 106 may be an acrylate material or epoxy that polymerizes when irradiated with light with appropriate properties (e.g., ultraviolet (UV), visible, or infrared radiation) in the presence of one or more appropriate photo-initiators 114. As described further below, the photo-initiators 114, following exposure to light, may promote the polymerization of the polymerizable component(s) 106.

The polymerizable component(s) 106 may be combined to form linear macromolecules and/or three-dimensional macromolecules (e.g., crosslinked polymers). The polymerizable component(s) 106 may be combined (e.g., polymerized, cured, etc.) via free radical polymerization, acid-catalyzed (cationic) polymerization, or a combination of both.

The polymerizable component(s) 106 may include any materials that can participate in a photo-polymerization reaction, for example, such as a photopolymerizable monomer, oligomer, or polymer or as a photoinitiator or co-initiator. Such polymerizable component(s) 106 may be designed to participate in either free radical photocuring, where free radicals are generated upon exposure to light, or in acid-catalyzed photocuring in which an acid is generated by exposure to light for reaction and curing of an epoxy compound, or both.

The polymerizable component(s) 106 may include one or more free-radically polymerizable compounds. Examples of such polymerizable component(s) 106 include ethylenically unsaturated polymerizable monomers and/or oligomers and polymers such as mono-functional or multi-functional acrylates (e.g., methacrylates). Such free-radically polymerizable compounds include at least one ethylenically unsaturated polymerizable bond and may include two or more such unsaturated moieties. These materials include at least one ethylenically unsaturated polymerizable bond and are generally capable of undergoing addition (e.g., or free radical) polymerization. Examples of polymerizable component(s) 106 that react via free-radical polymerization include mono-, di-, and poly-acrylates and methacrylates including, but not limited to, methyl acrylate, methyl methacrylate, ethyl acrylate, isopropyl methacrylate, n-hexyl acrylate, stearyl acrylate, allyl acrylate, glycerol diacrylate, glycerol triacrylate, ethylene glycol diacrylate, diethylene glycol diacrylate, triethylene glycol dimethacrylate, 1,3-propanediol diacrylate, 1,3-propanediol dimethacrylate, 1,4-butanediol diacrylate, 1,6-hexanediol diacrylate, neopentyl glycol diacrylate, neopentyl glycol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, dipentaetrythritol hexaacrylate, sorbitol hexaacrylate, bis[1-(2-acryloxy)]-p-ethoxyphenyl-dimethylmethane, bis[1-(3-acryloxy-2-hydroxy)]-p-propoxyphenyldimethyl-methane, and tris-hydroxyethyl-isocyanurate trimethacrylate. Bis-acrylates and bis-methacrylates of polyethylene glycols used as polymerizable component(s) 106 generally have a molecular weight from 200 to about 500. Other examples of polymerizable component(s) 106 that react via free-radical polymerization include co-polymerizable mixtures of acrylate monomers and acrylate oligomers. Other examples of polymerizable component(s) 106 include vinyl compounds such as styrene and styrene derivatives, diallyl phthalate, divinyl succinate, divinyl adipate, and divinyl phthalate. In general, the polymerizable component(s) 106 may include mixtures of any two or more of the free-radical polymerizable materials described above.

One or more of the polymerizable component(s) 106 may be an acid-catalyzed polymerizable compound. Examples of polymerizable component(s) 106 that can participate in acid-catalyzed reactions include photopolymerizable epoxy materials (e.g., organic compounds having at least one oxirane ring which is polymerizable via a ring-opening reaction). Such epoxy materials, also referred to as "epoxides," may include monomeric epoxy compounds and polymeric epoxides. Epoxides used as polymerizable component(s) 106 can be aliphatic, cycloaliphatic, aromatic, or heterocyclic. Such materials generally include, on average, at least one polymerizable epoxy group per molecule. In some embodiments, such materials include from about 1.5 and to about 2 polymerizable epoxy groups per molecule. The "average" number of epoxy groups per molecule is determined by dividing the total number of epoxy groups in the epoxy material by the total number of epoxy-containing molecules present. Polymeric epoxy materials that may be used as polymerizable component(s) 106 include linear polymers having terminal epoxy groups (e.g., a diglycidyl ether of a polyoxyalkylene glycol), polymers having skeletal (backbone) oxirane units (e.g., polybutadiene polyepoxide), and polymers having pendant epoxy groups (e.g., a glycidyl methacrylate polymer or copolymer).

Epoxy materials used as polymerizable component(s) 106 can vary from low molecular weight monomeric materials to high molecular weight polymers. These epoxy materials may have a wide variety of backbone structures and substituent (or pendant) groups. For example, the backbone of such an epoxy material may be of any type, and substituent groups thereon may be any group that does not substantially interfere with cationic photocuring at room temperature. Illustrative examples of possible substituent groups include, but are not limited to, halogen groups, ester groups, ether groups, sulfonate groups, siloxane groups, nitro groups, and phosphate groups. The molecular weight of an epoxy material used as polymerizable component(s) 106 may be in a range from at least 58 to about 100,000 (grams/mole). In some embodiments, the molecular weight is greater than 100,000.

Example epoxy materials for use as polymerizable component(s) 106 include glycidyl ethers (e.g., bisphenol-A-diglycidyl ether (DGEBA)), glycidyl ethers of bisphenol S and bisphenol F, butanediol diglycidyl ether, bisphenol-A-extended glycidyl ethers, phenol-formaldehyde glycidyl ethers (e.g., epoxy novolacs), cresol-formaldehyde glycidyl ethers (e.g., epoxy cresol novolacs), epoxidized alkenes, 1,2-epoxyoctane, 1,2,13,14-tetradecane diepoxide, 1,2,7,8-octane diepoxide, octadecylene oxide, epichlorohydrin, styrene oxide, vinyl cyclohexene oxicyclohexene oxide, glycidol, glycidyl methacrylate, diglycidyl ether of Bisphenol A, vinyl cyclohexene dioxide, 3,4-epoxycyclohexylmethyl-3,4-epoxycyclohexene carboxylate, 3,4-epoxy-6-methylcyclohexylmethyl-3,4-epoxy-6-methyl-cyclohexene carboxylate, bis(3,4-epoxy-6-methylcyclohexylmethyl) adipate, bis (2,3-epoxy-cyclopentyl) ether, aliphatic epoxy modified with polypropylene glycol, dipentene dioxide, epoxidized polybutadiene, silicone resin containing epoxy functionality, flame retardant epoxy resins, 1,4-butanediol diglycidyl ether of phenol formaldehyde novolak, resorcinol diglycidyl ether, 2-(3,4-epoxycyclohexyl-5,5-spiro-3,4-epoxy)cyclohexane-meta-dioxane, 2-(3,4-epoxycyclohexyl-5,5-spiro-3,4-epoxy)cyclohexane-meta-dioxane, vinyl cyclohexene monoxide, 1,2-epoxyhexadecane, alkyl glycidyl ethers, butyl glycidyl ether, cresyl glycidyl ether, p-tert butylphenyl glycidyl ether, polyfunctional glycidyl ethers such as diglycidyl ether of 1,4-butanediol, diglycidyl ether of neopentyl glycol, diglycidyl ether of cyclohexanedimethanol, trimethylol ethane triglycidyl ether, trimethylol propane triglycidyl ether, a polyglycidyl ether of an aliphatic polyol, polyglycol diepoxide, bisphenol F epoxides, and 9,9-bis-4-(2,3-epoxypropoxy)-phenyl fluorenone.

Although the amount of the polymerizable components(s) 106 is not particularly limited, these component(s) 106 may be present in the precursor 102 in an amount of at least 1 weight % and up to and including 75 weight % (where weight % is based on the total weight of components 104, 106, 108, 110, 112, 114, 116, 118 of the precursor 102). In some embodiments, polymerizable component(s) 106 are present in an amount of at least 5 weight % and up to and including 50 weight %. In some embodiments, polymerizable component(s) 106 are present in an amount of at least 5 weight % and up to and including 10 weight %. The amount of polymerizable component(s) 106 can generally be adjusted based on desired properties of the precursor 102 (e.g., solubility of components in the precursor 102) and/or the resulting mechanical properties (e.g., mechanical strength) of the semi-IPN SPE 100.

Example Lithium Ion Source(s) 108

The lithium ion source(s) 108 may include any one or more lithium salts and/or lithium-ion complexes (e.g., inorganic and/or inorganic salts and/or complexes). Representative examples of suitable inorganic salts for use as lithium ion source(s) 108 are alkali metal salts. Inorganic salts may include lithium cations and anions of weak bases. Such anions may have relatively large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2—$, and the like. Further examples of suitable inorganic lithium salts include LiSCN, $(CF_3SO_2)_2NLi$, $(CF_3SO_2)_3CLi$, and the like. Examples of lithium salts and complexes for use as lithium ion source(s) 108 include lithium nitrate (LiNO3), lithium iodide (LiI), lithium sulfide ($Li_2S$), lithium perchlorate ($LiClO_4$), lithium trifluoromethanesulfonate ($LiCF_3SO_3$), lithium hexafluoroarsenate(V) ($LiAsF_6$), lithium hexafluorophosphate ($LiPF_6$), and lithium tetrafluoroborate ($LiBF_4$). In some embodiments, the lithium salts used as a lithium ion source 108 are limited to $LiAsF_6$, $LiCF_3SO_3$, $LiPF_6$, $LiBF_4$, or a mixture on or more of these salts. Lithium ion source(s) may be present in the precursor 102 at a concentration from about 1 weight % to about 80 weight % (where weight % is based on the total weight of components 104, 106, 10-8, 110, 112, 114, 116, 118 of the precursor 102). In some embodiments, the lithium ion source(s) 108 are present in the precursor 102 at a concentration from about 5 weight % to about 40 weight %. The weight % of lithium ion source(s) 108 may be adjusted based on the structure and molecular weight of a given salt.

Example Solvent(s) 110

The solvent(s) 110 of the precursor 102 may generally be any solvent (e.g., organic solvent) capable of dissolving and/or dispersing the components 104, 106, 108, 112, 114, 116, and 118. In most embodiments, at least the polymer(s) 104 dissolve in (i.e., are soluble in) the solvent(s) 110. In some embodiments, each of the one or more solvent(s) 110 used in the precursor composition 102 has a boiling point greater than or equal to 90° C. In some embodiments, each of the one or more solvents 110 used in the precursor composition 102 has a boiling point of at least 100° C. In some embodiments, each of the one or more solvents 110 used in the precursor composition 102 has a boiling point of at least 150° C. In some embodiments, each of the one or more solvents 110 used in the precursor composition 102 has a boiling point greater than about 200° C. Generally, the boiling point of the solvent(s) 110 is less than 500° C. If the solvents 110 include two or more different organic solvents, the difference in boiling points between any two of the organic solvents may be greater than 10° C.

Examples of solvent(s) 110 include one or more hydroxylic organic solvents (e.g., alcohols) or non-hydroxylic solvents. While the solvent(s) 110 generally may include primary and/or secondary alcohols as well as monohydric and/or polyhydric alcohols, in some embodiments, the alcohols used as solvent(s) 110 are free from olefinic unsaturation. In other words, in some embodiments, alcohol solvent(s) 110 do not include carbon-carbon double bonds. Examples of hydroxylic solvent(s) 110 include straight-chain or branched-chain alcohols with none, either, or both of alicyclic and aromatic carbon-to-carbon moieties. Representative examples of suitable straight-chain primary alcohol solvent(s) 110 include ethanol, 2-propanol, 2-butanol, 1-pentanol, 1-hexanol, 1-octanol, 2-ethyl-1-hexanol, 1-decanol, ethylene glycol, propylene glycol, and benzyl alcohol. Representative examples of branched-chain alcohol solvent(s) 110 include isobutyl alcohol, isoamyl alcohol, and secondary butyl carbinol. Representative examples of secondary alcohol solvent(s) 110 include isopropyl alcohol, secondary butyl alcohol, secondary amyl alcohol, diethyl carbinol, methyl isobutyl carbinol, methyl-3-heptanol, diisobutyl carbinol, dodecanol-Z, methyl allyl carbinol, cyclohexanol, methyl cyclohexyl carbinol, phenyl methyl carbinol, and similar materials. Combinations of any of these alcohol solvent(s) 110 can be used.

In some embodiments the solvent(s) 110 include glycol ethers with both an ether and alcohol functional group in the same molecule. Representative examples of such glycol ether solvent(s) 110 include 2-methoxyethanol, 2-ethoxyethanol, diethylene glycol monoethyl ether (carbitol), and methoxy isopropanol. Solvent(s) 110 may include a mixture of these or similar materials. Further examples of solvent(s) 110 include but are not limited to dimethylformamide (DMF), dimethyl sulfoxide (DMSO), ketone solvents, ester solvents, carbonate solvents, and the like.

Any appropriate amount of the one or more solvents 110 may be included in the precursor 102. The solvent(s) 110 may be present in the precursor 102 at an amount of at least 50 weight % and up to and including 95 weight % (where weight % is based on the total weight of components 104, 106, 108, 110, 112, 114, 116, 118 of the precursor 102). In some embodiments, the solvent(s) 110 are present in the precursor 102 at an amount of at least 70 weight % and up to and including 90 weight %. In some embodiments, the solvent(s) 110 are present in the precursor 102 at an amount of at least 75 weight % and up to and including 90 weight %.

In some embodiments, the solvent(s) 110 may be selected based on the relative solubility of one or more of the components 104, 106, 108, 110, 112, 114, 116, 118 in the solvent(s) 110. In some embodiments, the solvent(s) may be selected at least in part based on the anticipated solubility of the polymer(s) 104 in the solvent(s) 110. For example, a solubility parameter (e.g., total Hansen parameter) may be determined for the polymer(s) 104 and the solvent(s). The solvent(s) 110 may be selected such that these parameters indicate that the polymer(s) 104 should be soluble in the solvent(s) 110. For example, the solubility parameters of the one or more polymers 104 and the one or more solvents 110 may be within a predefined range. In some embodiments, the solvent(s) 110 have a total solubility parameter equal to or greater than the total solubility parameter of the one or more polymers 104. In such embodiments, if a mixture of solvents 110 is used, the total solubility parameter of this mixture is equal to or greater than the total solubility parameter of the polymer(s) 104. The solvent(s) 110 may further be selected to maintain a predefined total solubility parameter with a certain range even as the profile of the solvents changes during deposition of the precursor 102 (e.g., when solvent(s) evaporate during preparation of a film of the precursor 102 as described with respect to step 318 of FIG. 3 below).

The solubility parameters of various molecules can generally be determined from manufacturer information (when available), estimated from studies of similar materials, and/or determined via solubility studies. For example, the total Hansen parameter of an organic solvent mixture can be calculated using the sum of volume fractions of the individual organic solvent components in solution. The total Hansen parameter is an example of a solubility parameter and provides information about whether one material is anticipated to dissolve in another material. Each molecule is given three Hansen parameters, each generally measured in Mpa$^{0.5}$: (1) the $\delta_D$ parameter represents the energy from dispersion bonds between molecules, (2) the $\delta_P$ parameter represents the energy from polar bonds between molecules, and (3) the $\delta_H$ parameter represents the energy from hydrogen bonds between molecules. The total Hansen solubility parameter ($\delta$) is given by $\delta=\delta_D^2+\delta_P^2+\delta_{PH}^2$. The three Hansen parameters ($\delta_D$, $\delta_P$, $\delta_H$) can be treated as coordinates for a point in three dimensions also known as "Hansen space." The nearer that two molecules are in this three-dimensional space, the more likely they are to dissolve in (i.e., be soluble in) each other. As an example, to determine if the total Hansen parameters of a solvent 110 and a polymer 104 indicate that the polymer 104 will dissolve in the solvent 110, a relative energy difference (e.g., a difference between the ($\delta_D$, $\delta_P$, $\delta_H$) coordinates for the solvent(s) and polymer(s) 104 in Hansen space) can be determined, based on the values of $\delta_D$, $\delta_P$, and $\delta_H$ for the solvent 110 and polymer 104.

Example Plasticizer(s) 112

Any plasticizer(s) 112 may be used in the precursor 102. The one or more plasticizers 112 are generally selected to reduce the melting temperature and/or the melt viscosity of the polymer(s) 104. The plasticizer(s) 112 may be monomeric or polymeric. In some embodiments, the plasticizer(s) 112 include at least one phosphate plasticizer, benzoate plasticizer, adipate plasticizer, phthalate plasticizer, glycolic acid ester plasticizer, citric acid ester plasticizer, and/or hydroxyl-functionalized plasticizer. In some embodiments, the plasticizer(s) 112 include one or more of triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl)citrate.

In some embodiments, the plasticizer(s) 112 include: (1) at least one acid residue including residues of phthalic acid, adipic acid, trimellitic acid, succinic acid, benzoic acid, azelaic acid, terephthalic acid, isophthalic acid, butyric acid, glutaric acid, citric acid, and/or phosphoric acid; and (2) alcohol residues with one or more residues of an aliphatic, cycloaliphatic, or aromatic alcohol containing up to about 20 carbon atoms. In some embodiments, the plasticizer(s) 112 include alcohol residues such as stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol residues. In some embodiments, the plasticizer(s) 112 include at least one of benzoates, phthalates, phosphates, arylene-bis(diaryl phosphate), and isophthalates. In some embodiment, the plasticizer includes diethylene glycol dibenzoate (DEGDB).

In some embodiments, the plasticizer(s) 112 include (1) aliphatic polyesters containing C2-10 diacid residues such as, for example, malonic acid, succinic acid, glutaric acid, adipic acid, pimelic acid, suberic acid, azelaic acid, and sebacic acid; and (2) C2-10 diol residues. In some embodiments, the plasticizer(s) 112 include diol residues such as residues of at least one of C2-C10 diols (e.g., ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol).

In some embodiments, the plasticizer(s) 112 include polyglycols, such as, for example, polyethylene glycol, polypropylene glycol, and polybutylene glycol. These polyglycols may include molecules from low molecular-weight dimers and trimers and/or high molecular-weight oligomers and polymers. In some embodiments, the molecular weight of the polyglycol(s) included in the plasticizer(s) 112 can range from about 200 to about 2,000.

In some embodiments, the plasticizer(s) 112 include at least one of Resoflex® R296 plasticizer, Resoflex® 804 plasticizer, sorbitol hexapropionate (SHP), xylitol pentapropionate (XPP), xylitol pentaacetate (XPA), glucose pentaacetate (GPP), glucose pentapropionate (GPA), and arabitol pentapropionate (APP). In some embodiments, the plasticizer(s) 112 include one or more of: (1) from about 5 to about 95 weight % of a C2-C12 carbohydrate organic ester, where the carbohydrate includes from about 1 to about 3 monosaccharide units; and (2) from about 5 to about 95 weight % of a C2-C12 polyol ester, where the polyol is derived from a C5 or C6 carbohydrate. In some embodiments, the polyol ester of the plasticizer(s) 112 does not include or contain a polyol acetate or polyol acetates.

In some embodiments, the plasticizer(s) 112 include at least one carbohydrate ester, and the carbohydrate portion of the carbohydrate ester is derived from one or more of glucose, galactose, mannose, xylose, arabinose, lactose, fructose, sorbose, sucrose, cellobiose, cellotriose, and raffinose. In some embodiments, the polymer 104 (e.g., cellulose ester) is modified using one or more of the plasticizers 112. The plasticizer(s) 112 may be present in the precursor 102 at an amount of about 1 weight % to 10 weight % (where weight % is based on the total weight of components 104, 106, 108, 110, 112, 114, 116, 118 of the precursor 102). In some embodiments, the plasticizer(s) 112 include no more than about 5 weight % of the precursor 102.

Example Photo-Initiator(s) 114

The photo-initiator(s) 114 of the precursor 102 may include one or more photo-initiators for free-radical polymerization, which generate free radicals in the presence of at least one of the polymerizable component(s) 106. Such free radical photo-initiators 114 include any compound that is capable of generating free radicals upon exposure to photopolymerizing radiation, such as ultraviolet or visible radiation. Example free radical photo-initiators 114 may be triazine compounds, thioxantone compounds, benzoin compounds, carbazole compounds, diketone compounds, sulfonium borate compounds, diazo compounds, biimidazole compounds, and any combination of these. The photo-initiator(s) 114 may include benzophenone compounds such as benzophenone, benzoyl benzoate, methyl benzoyl benzoate, 4-phenyl benzophenone, hydroxyl benzophenone, acrylated benzophenone, 4,4'-bis(dimethylamino)benzophenone, 4,4'-bis(diethylamino)benzophenone, anthra-quinone compounds, and acetophenone compounds (e.g., 2,2'-diethoxyacetophenone, 2,2'-dibutoxyacetophenone, 2-hydroxy-2-methylpropio-phenone, para-t-butyltri-chloroacetophenone, para-t-butyldichloroacetophenone, benzophenone, 4-chloro-acetophenone, 4,4'-dimethylaminobenzophenone, 4,4'-dichlorobenzophenone, 3,3'-dimethyl-2-methoxybenzophenone, 2,2'-dichloro-4-phenoxy acetophenone, 2-methyl-1-(4-(methylthio)phenyl)-2-morpholinopropan-1-one, and 2-benzyl-2-dimethylamino-1-(4-morpholinophenyl)-butane-1-one). Further compounds which may be used as photo-initiator(s) 114 include triazine compounds, benzophenone compounds, acetophenone compounds, thioxantone compounds, benzoin compounds, carbazole compounds, diketone compounds, sulfonium borate compounds, diazo compounds, and biimidazole compounds.

The photo-initiator(s) 114 of the precursor 102 may include one or more photo-initiators for acid polymerization. Various compounds can be used to generate a suitable acid to participate in the polymerization of the polymerizable component(s) 106 (e.g., and particularly the epoxy polymerizable component(s) 106 described above). Such "photoacid generators" may be acidic in nature while others may be nonionic. Examples of acid generators include onium salt acid generators, such as diazonium salts (e.g., polyaryl diazonium), phosphonium salts, iodonium salts, and/or sulfonium salts. Example iodonium and sulfonium salts include diaryliodonium and triarylsulfonium salts. Counteranions in such salts include complex metal halides, such as tetrafluoroborate, hexafluoroantimonate, trifluoromethanesulfonate, hexafluoroarsenate, hexafluorophosphate, and arenesulfonate. The onium salts can be oligomeric or polymeric compounds having one or more onium salt moieties.

The photo-initiators 114 described above may be dispersed, individually or in combination, in the precursor 102 in an amount in a range from about 0.1 weight % to about 10 weight % (where weight % is based on the total weight of components 104, 106, 108, 110, 112, 114, 116, 118 of the precursor 102).

In some embodiments, the ceramic particles 116 (described below) may function as a photo-initiator 114. For instance, $TiO_2$ and/or ZnO particles may function to initiate photo-polymerization reactions.

Example Ceramic Particles 116

As described above, the ceramic particles 116 provide improved mechanical strength and ionic conductivity to the semi-IPN SPE 100. In particular, the ceramic particles 116 were found to provide an unexpectedly large increase in both the ionic conductivity and the mechanical strength of the semi-IPN SPE 100 (see experimental examples described below). The ceramic particles 116 may include metal oxide particles such as $TiO_2$, $Al_2O_3$, $SiO_2$, $ZrO2$, $SnO_2$, $WO_3$, $Ta_2O_3$, or a combination of these.

The ceramic particles 116 may have any shape. For example, the ceramic particles 116 may have a spherical, oval, tetrahedral, pyramidal, cuboctahedral, cylindrical, polyhedral, multi-armed, and/or cubic shape. The ceramic particles 116 may be nanoparticles with a characteristic size (e.g., diameter) from about 1 nm to about 100 nm. In some embodiments, the ceramic particles 116 have a diameter in a range from about 0.5 nm to about 100 nm. In some embodiments, the ceramic particles 116 have a diameter in a range from about 1 nm to about 5 nm. The example particle diameter ranges described above may be average particle diameter from a group of measured particle diameters for the ceramic particles 116. In some cases, an average particle diameter refers to a number average diameter. An "average diameter" may be a D50 particle diameter (i.e., where half particles measured have a larger diameter and half have a smaller diameter).

The ceramic particles 116 are generally dispersed in the precursor 102 in an amount from about 1 weight % to about 25 weight % (where weight % is based on the total weight of components 104, 106, 108, 110, 112, 114, 116, 118 of the precursor 102). In some embodiments, the ceramic particles 116 are included in the precursor 102 at an amount from about 2 weight to about 7 weight %. In some embodiments, the ceramic particles 116 are included in the precursor 102 at an amount from about 3 weight % to about 5 weight %.

Example Vinyl Backbone Polymers 118

As described above, in some embodiments, the precursor includes one or more polymers 118 with a vinylic backbone and a molecular weight of less than about 100,000. In some embodiments, the molecular weight of the polymer(s) 118 is less than 50,000. In some embodiments, the molecular weight of the polymer(s) 118 is less than 25,000. Examples of such polymers 118 include poly(alkyl methacrylate), poly(alkyl acrylates), poly(vinyl acetate), poly(alpha olefins), poly(styrene sulfonate), polystyrene, poly(acrylic acids) (and salts thereof), poly(methacrylic acids) (and salts thereof), and the like. These optional vinylic backbone polymers 118 may be present in the precursor 102 in an amount in a range from about 1 weight % to 10 weight % (where weight % is based on the total weight of components 104, 106, 108, 110, 112, 114, 116, 118 of the precursor 102).

Example Methods of Preparing Semi-IPN SPE and Electrodes Comprising Same

Figure 3:
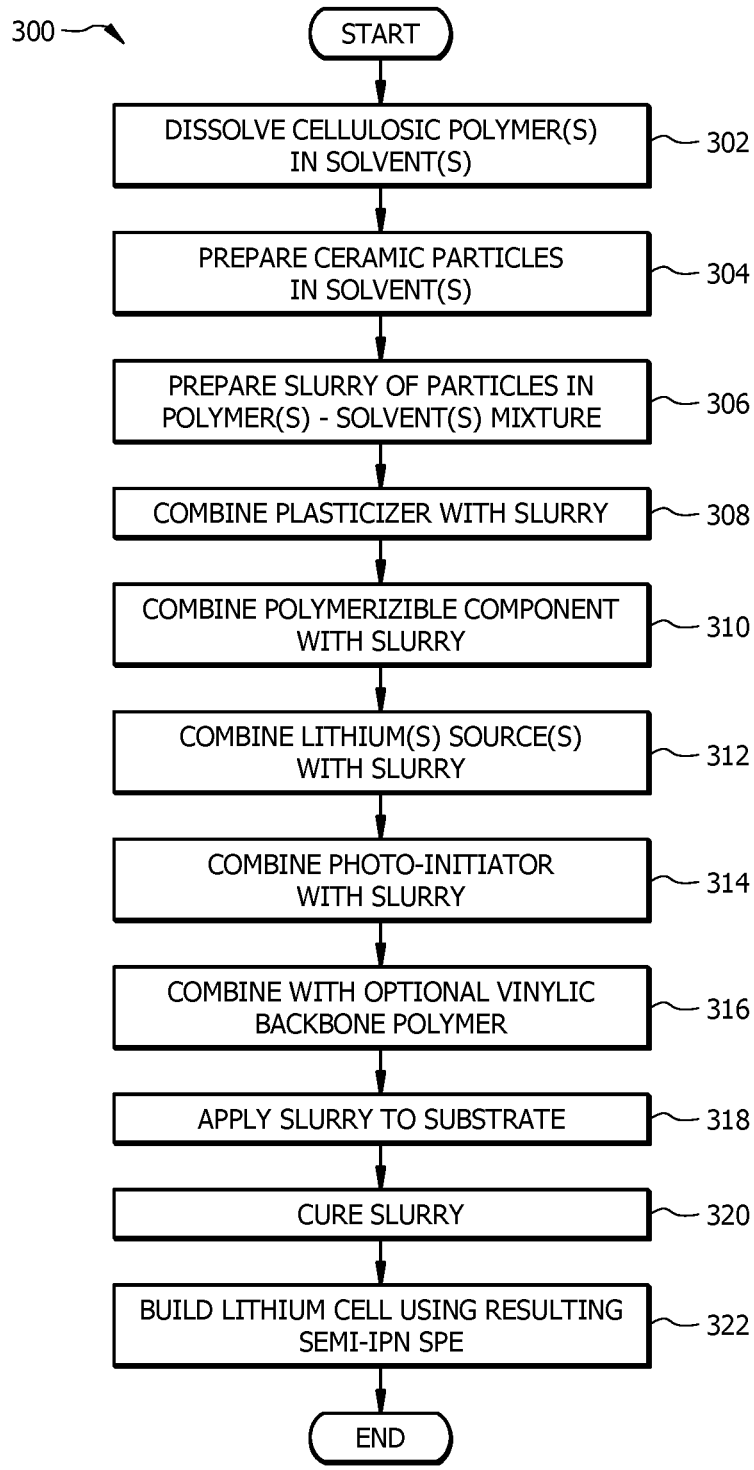
FIG. 3 is a flowchart of an example method for preparing the precursor and solid polymer electrolyte film of FIG. 1.

FIG. 3 illustrates an example process 300 for preparing the semi-IPN SPE 100 of FIG. 1. The method 300 may begin at step 302 where the one or more polymer(s) 104 are combined with the solvent(s) 110. For example, a predetermined quantity of the polymer(s) 104 (e.g., cellulose acetate) may be added to a volume of the solvent(s) 110. As described above, the solvent(s) 110 may be selected such that the polymer(s) 104 dissolve in the solvent(s) 110. The resulting solution with polymer(s) 104 dissolved in the solvent(s) 110 may have a polymer(s) 104 concentration between 0.1 weight % to 30 weight % (where weight % is based on the mass of polymer(s) 104 per total mass of the polymer-in-solvent solution).

At step 304, the ceramic particles 116 are prepared. The ceramic particles 116 may be prepared using any appropriate method. For example, a powder of a ceramic material may be ball milled to prepare ceramic particles 116. In some embodiments, ceramic particles 116 are obtained in a pre-prepared form such that step 304 is not required.

At step 306, a slurry of the ceramic particles 116 is prepared. For example, the ceramic particles 116 may be combined with a volume of the solvent(s) 110 used to dissolve the polymer(s) 104 at step 302 and/or other solvent(s) 110. The ceramic particles 116 and solvent(s) 110 may be combined via a ball milling process to disperse the ceramic particles 116 in the solvent(s) 110. This initial slurry of ceramic particles 116 may then be combined with all or a portion of the polymer-in-solvent solution prepared at step 302. For example, the polymer-in-solvent solution from step 302 may be combined with the initial slurry. In some embodiments, first portion of the polymer-in-solvent solution from step 302 may be combined with the initial slurry near the end of the ceramic particle 116 milling process to prepare the slurry of the ceramic particles 116. Following completion of the milling process, the second portion of the polymer-in-solvent solution may be combined with this mixture. The ratio by mass of polymer(s) 104 to ceramic particles 116 may be in a range from about one to about 600. In some embodiments, the ratio by mass of polymer(s) 104 to ceramic particles 116 is in a range from about one to about 400.

At step 308, the plasticizer(s) 112 are combined with the mixture from step 306. For example, the plasticizer(s) 112 may be combined with the mixture via mixing with the aid of a mechanical stirrer/mixer and/or ball milling. Generally, sufficient mixing is provided for the plasticizer(s) 112 to be dispersed or dissolved within the mixture. The ratio by mass of plasticizer(s) 112 to polymer(s) 104 is generally in a range from about 0.001 to about 32.

At step 310, the polymerizable component(s) 106 are combined with the mixture from step 308. For example, the polymerizable component(s) 106 may be combined with the mixture via mixing (e.g., using a mechanical mixer and/or ball mill). The ratio by mass of the polymer(s) 104 to the polymerizable component(s) 106 is in a range from about 0.1 to about 20.

At step 312, the lithium-ion source(s) 108 are combined with the mixture from step 310. For example, the lithium-ion source(s) 108 may be combined with the mixture via mixing (e.g., using a mechanical mixer and/or ball mill). In some embodiments, the lithium-ion source(s) 108 are first dissolved in one or more of the solvents 110, and the resulting lithium-in-solvent solution is combined with the mixture from step 310. The ratio by mass of the lithium-ion source(s) 108 to the polymer(s) 104 is in a range from about 0.01 and 100. As described with respect to FIG. 1 above, in some embodiments, addition of the lithium-ion source(s) 108 at step 312 is delayed until a later time when preparation of the semi-IPN SPE 100 is desired. For example, the premixed portion 103 of the precursor 103 (see FIG. 1) may first be prepared (e.g., by performing steps 302, 304, 306, 308, 310, 314, and/or 316). This premixed precursor portion 103 may be stored under appropriate storage conditions (e.g., in the absence of light which may induce any reactions of the polymerizable component(s) 106 and/or photo-initiator(s) 114) and used when desired.

At step 314, the photo-initiator(s) 112 are combined with the mixture from step 312. For example, the photo-initiator(s) 112 may be combined with the mixture via mixing (e.g., using a mechanical mixer and/or ball mill). The ratio by mass of the photo-initiator(s) 112 to the polymerizable component(s) 106 is in a range from about 0.001 to about 10. In some embodiments, addition of the photo-initiator(s) 112 at step 314 may be delayed until preparation of the SPE 100 is desired. For example, a portion of the precursor 102 (or the premixed precursor portion 103) without the photo-initiator(s) 112 may be stored without risk of photochemical reactions occurring to an appreciable extent before preparation of the semi-IPN SPE 100 is desired.

At step 316, the vinylic backbone polymer(s) 118 may optionally be combined with the mixture from step 314. For example, the vinylic backbone polymer(s) 118 may be combined with the mixture via mixing (e.g., using a mechanical mixer and/or ball mill). The ratio by mass of the polymer(s) 104 to the vinylic backbone polymer(s) 118 is in a range from about one weight % to about ten weight %.

At step 318, one or more layers of the precursor 102 from the proceedings steps is applied to a substrate. The substrate may be any appropriate material (e.g., aluminum). The precursor 102 may be applied to the substrate using any appropriate method. Examples of such methods include, but are not limited to, air knife coating, gravure coating, hopper coating, roller coating, spray coating, electrochemical coating, inkjet printing, and flexographic printing. In some embodiments, a layer of the precursor 102 may be contact-printed in a desired pattern (e.g., to prepare thin films of the semi-IPN SPE 100 in a desired pattern and/or to prepare cells 200 of an appropriate size, shape, pattern, etc.). Such a contact-printing approach may facilitate scale-up for preparation of semi-IPN SPE 100 in large quantities at a relatively low cost. For example, this contact-printing approach may involve a layer of the precursor 102 being applied to a donor member and transferred to a receiver member via the application of heat and/or pressure. An adhesive layer may be present between the layer of the precursor 102 and the receiver member. Generally, the applied precursor 102 may be allowed to dry for a period of time an increased temperature (e.g., of about 100° C.) before proceeding to step 320.

At step 320, the precursor 102 applied at step 318 is cured. For example, the precursor 102 may be exposed to heat and/or light. For instance, the precursor 102 layer of step 318 may be irradiated with light (e.g., UV light) for a predetermined time (e.g., in a range from about one second to ten minutes or more). Generally, the curing process may proceed for as long as required to prepare a tack-free semi-IPN SPE 100. Following polymerization, the semi-IPN SPE 100 may be further dried and annealed be heating for a period of time (e.g., at 100° C. to 150° C. for one or more hours). The resulting semi-IPN SPE 100 may be a thin film (e.g., with a thickness of less than 200 micrometers). In some embodiments, the semi-IPN SPE 100 has a thickness of less than 150 micrometers. In some embodiments, the semi-IPN SPE 100 has a thickness of less than 100 micrometers. In some embodiments, the semi-IPN SPE 100 has a thickness in a range from about 10 micrometers to less than 100 micrometers.

At step 322, a cell (e.g., lithium cell 200 illustrated in FIG. 2) is prepared using the semi-IPN SPE 100 from step 320. For example, the SPE film 100 may be disposed (e.g., sandwiched) between the two electrodes 202, 204 to obtain a cell the same as or similar to cell 200 illustrated in FIG. 2. In some embodiments, multiple cells 200 may be prepared and appropriately combined (e.g., stacked in series) to prepare a battery of a desired voltage. Appropriate electrical contacts may be provided for draining and charging the cell 200.

A cell 200, prepared at step 322, may have any appropriate configuration. For example, the cell 200 may be configured based on the type of electrode used. For example, one or both of the electrodes 202, 204 of the cell 200 may be blocking electrodes through which lithium ions do no pass. Example of blocking electrodes include an aluminum foil or stainless steel foil. The thickness of such foils may be in range from about 5 micrometers to about 50 micrometers. A cell 200 with blocking electrodes as electrodes 202, 204 may be used for ionic conductivity measurements. In some cases, one or both of the electrodes 202, 204 may be a lithium metal foil. The thickness of the lithium metal foil may be from about 25 to about 100 micrometers. A cell 200 with lithium foil electrodes 202, 204 may be used, for example, to determine the electrochemical stability window of the semi-IPN SPE 100, to determine lithium plating and/or stripping behavior associated with the presence of the semi-IPN SPE 100, and the like. In some embodiments, the cathode 202 may be any other appropriate cathode material (e.g., lithium nickel manganese cobalt oxide with a thickness of about 20 to 200 micrometers), and the anode 204 may be any appropriate anode material (e.g., graphite with a thickness of about 20 to 200 micrometers, or lithium metal, as described above).

As an example, the cell 200 may be prepared by coating the precursor 102 on a metal foil (e.g., aluminum foil, stainless steel foil, or the like) or other surface (e.g., glass). The film of the precursor 102 may then be irradiated with light (e.g., UV light) of an appropriate power and wavelength for a period of time (e.g., to activate the photoinitiator(s) 114). The film is then cured and dried (e.g., at a temperature of 50 to 100° C.) to generate the thin film semi-IPN SPE 100 with a thickness in range from about five micrometers to about 500 micrometers. The film semi-IPNM SPE 100 may be removed (e.g., via peeling) from the metal foil or other surface. The film semi-IPN SPE 100 is then sandwiched between the anode 204 and cathode 202.

As described above, the cathode 202 may include any cathode active materials and/or components. For example, the cathode active material may include lithium cobalt oxide ($LiCoO_2$), lithium iron phosphate ($LiFePO_4$), lithium nickel manganese cobalt oxide ($LiNi_xMn_yCo_zO_2$), lithium nickel cobalt aluminum oxide ($LiNi_xCo_yAl_zO_2$), or a mixture thereof. Other cathode components may include conductive carbon, polymer binders, other additives, and any combination of these. The polymer binder may include, for example, poly(vinylidene fluoride), poly(tetrafluoroethylene), carboxymethylcellulose, poly(acrylic acid), styrene-butadiene rubber, or a mixture of any one or more of these. The cathode 202 may be a film with any appropriate thicknesses. In some embodiments, the cathode 202 has a thickness of about 20 to about 500 micrometers.

As also described above, the anode 204 may consist any anode active materials and/or other anode component(s). The anode active material may include, for example, graphite, graphene, carbon nanotubes, carbon black, silicon, doped silicon, silicon oxide ($SiO_x$), tin, tin oxide, lithium titanate ($Li_4Ti_5O_{12}$), or a mixture thereof. Other cathode components may include any of conductive carbon, polymer binders, and/or other additives. The polymer binder may include, for example, poly(vinylidene fluoride), poly(tetrafluoroethylene), carboxymethylcellulose, poly(acrylic acid), styrene-butadiene rubber, or a mixture thereof. The anode 204 may be a film with any appropriate thickness. In some embodiments, the anode 204 has a thickness of about 20 to about 500 micrometers.

After the film of the semi-IPN SPE 100 is sandwiched between the cathode 202 and anode 204, a pressure is applied to laminate the semi-IPN SPE 100 between the cathode and anode to form a completed cell 200. This lamination process may create appropriate interfaces to form between the semi-IPN SPE 100 and the cathode and anode. The pressured applied may be in range from about one to $10^8$ newtons per meter squared ($N/m^2$). In some embodiments, pressure applied is in range from about $10^3$ to $10^5$ $N/m^2$. Heat may be applied while the pressure is applied. The heat may be provided, for example, via electrical heating and/or infrared heating. The temperature achieved via this heating may be in a range from about 25 to 250° C. In some embodiments, the temperature during application of pressure to the semi-IPN 100 sandwiched between the cathode 202 and anode 204 may be in a range from about 40 to about 80° C.

The laminated film may be cut into appropriately shaped pieces to generate a cell 200 of the desired shape. For example, the cell 200 may have a rectangular shape (e.g., for use as a pouch cell) or a cylindrical or circular disk shape (e.g., for use as a coin cell). For example, for pouch cells, aluminum/copper tabs may be welded to the cathode 202 and anode 204 of the cell 200. The resulting cells 200 may be stacked and placed in pouches which are vacuum sealed. For cylindrical cells, the cells may be wound to form a cylinder and placed in cylindrical cans, which are then sealed. For coin cells, circular disks of the cells 200 are placed in coin cell casings which are crimped to yield coin cells. Any of these types of cells can be connected to standard charge-discharge circuits to perform charge-discharge operations or connected to a potentiostat or dielectric spectrometer for impedance spectroscopy measurements.

In some embodiments, the semi-IPN SPE 100 may be prepared directly on the cathode 202. For example, the cell 200 may be prepared coating a cathode 202 (as described above) with the precursor 102. The cathode 202 coated with precursor may be irradiated with light (e.g., UV light or microwave irradiation) of an appropriate power and wavelength for a period of time (e.g., to activate the photoinitiator(s) 114). The film is then cured and dried (e.g., at a temperature of 50 to 100° C.) to generate the thin film semi-IPN SPE 100 with a thickness in range from about five micrometers to about 500 micrometers. In some embodiments, the thickness of the semi-IPN SPE 100 film is in a range from about 50 to 150 micrometers. The resulting structure (i.e., cathode 202 coated with semi-IPN SPE 100 film) may be laminated with an anode 204 by applying pressure and/or heat as described above. The resulting cell 200 may be cut and assembled into any cell type, as described above.

In some embodiments, the semi-IPN SPE 100 may be prepared directly on the anode 204. For example, the cell 200 may be prepared coating an anode 204 (as described above) with the precursor 102. The anode 204 coated with precursor may be irradiated with light (e.g., UV light or microwave irradiation) of an appropriate power and wavelength for a period of time (e.g., to activate the photo-initiator(s) 114). The film is then cured and dried (e.g., at a temperature of 50 to 100° C.) to generate the thin film semi-IPN SPE 100 with a thickness in range from about five micrometers to about 500 micrometers. In some embodiments, the thickness of the semi-IPN SPE 100 film is in a range from about 50 to 150 micrometers. The resulting structure (i.e., anode 204 coated with semi-IPN SPE 100 film) may be laminated with a cathode 202 by applying pressure and/or heat as described above. The resulting cell 200 may be cut and assembled into any cell type, as described above.

In some embodiments, the semi-IPN SPE 100 may be prepared a stand-alone film and laminated between the cathode 202 and anode 204, as described above. For example, the semi-IPN SPE 100 may be pre-coated on an appropriate current collector such as a metal sheet or foil. In some cases, the precursor mixture may be combined with the cathode and anode film and cured in-situ.

EXPERIMENTAL EXAMPLES

The preparation of example semi-IPN SPEs 100 are described the examples below. In these examples, fumed silica particles have a primary particle size of 10-20 nm. Fumed alumina particles have a primary particle size of 80 nm. Fumed titania (i.e., titanium dioxide) particles have a primary particle size of 21 nm. The fumed titania particles are 80-90% anatase with a smaller portion of rutile.

Example 1: Preparation of Semi-IPN Solid Polymer Electrolyte Precursor with Cellulose Acetate (CA) and a Polymerizable Oligomer A cellulose ester solution was prepared by dissolving, under agitation, cellulose acetate (0.72 g) in 2-methoxyethanol (7.73 g). After full dissolution, the cellulose ester solution (8.45 g) was combined with poly(ethylene glycol) 200 diacrylate (SR 259, 0.20 g), ethoxylated (15) trimethylolpropane triacrylate (SR 9035, 0.04 g), LiClO$_4$ (0.24 g), and a 9 weight % solution of the photo-initiator 2-benzyl-2-(dimethylamino)-4'-morpholinobutyrophenone in acetone (0.09 g). The resulting solution was homogenized via agitation.

The weight percentages of components in this precursor composition were: 8.0% CA, 2.6% LiClO$_4$, 2.2% SR 259, 0.4% SR 9035, and 0.1% 2-benzyl-2-(dimethylamino)-4'-morpholinobutyrophenone. In the dry-down form, of components in this precursor composition were 59.7% CA, 19.8% LiClO$_4$, 16.6% SR 259, 3.3% SR 9035, and 0.7% 2-benzyl-2-(dimethylamino)-4'-morpholinobutyrophenone.

Example 2: Preparation of Semi-IPN Solid Polymer Electrolyte Precursor with Cellulose Acetate Propionate (CAP) and a Polymerizable Oligomer A cellulose ester solution was prepared by dissolving, under agitation, cellulose acetate propionate (0.68 g) in 1-methoxy-2-propanol (6.13 g). After full dissolution, the cellulose ester solution (6.8 g) was combined with poly(ethylene glycol) 200 diacrylate (SR 259, 0.20 g), ethoxylated (15) trimethylolpropane triacrylate (SR 9035, 0.05 g), LiClO$_4$ (0.24 g), and a 9 weight % solution of 2-benzyl-2-(dimethylamino)-4'-morpholinobutyrophenone in acetone (0.10 g). The solution was homogenized via agitation.

The weight percentages of components in this example precursor composition were 9.1% CAP, 3.3% LiClO$_4$, 2.2% SR 259, 0.6% SR 9035, and 0.1% 2-benzyl-2-(dimethylamino)-4'-morpholinobutyrophenone. In the dry-down form, weight percentages of components in this example precursor composition were 57.4% CAP, 20.5% LiClO$_4$, 17.0% SR 259, 4.3% SR 9035, and 0.8% 2-benzyl-2-(dimethylamino)-4'-morpholinobutyrophenone.

Example 3: Preparation of Semi-IPN Solid Polymer Electrolyte Precursor with Cellulose Acetate Propionate (CAP), Polymerizable Oligomer, and Polycaprolactone Triol Plasticizer A cellulose ester solution was prepared by dissolving, under agitation, cellulose acetate propionate (16.30 g) in dimethylformamide (83.7 g). After full dissolution, the first cellulose ester solution (16.3%, 6.24 g) was combined with poly(ethylene glycol) 200 diacrylate (SR 259, 0.29 g), alkoxylated pentaerythritol tetraacrylate (SR 494, 0.145 g), polycaprolactone triol (Mw=300 0.076 g), lithium iodide (0.48 g), 2-benzyl-2-(dimethylamino)-4'-morpholinobutyrophenone (0.01 g), and 1-methoxy-2-propanol (2.83 g). The solution was homogenized via agitation.

The weight percentages of components in this example precursor composition were 10.1% CAP, 4.8% LiI, 2.9% SR 259, 1.4% SR 494, 0.8% poly(caprolactone triol), 0.1% 2-benzyl-2-(dimethylamino)-4'-morpholinobutyro-phenone, 28.1% 1-methoxy-2-propanol, and 51.8% dimethylformamide. In the dry-down form, weight percentages of components in this example precursor composition were 50.2% CAP, 23.9% LiI, 14.3% SR 259, 7.2% SR 494, 3.1% polycaprolactone triol, and 0.8% 2-benzyl-2-(dimethylamino)-4'-morpholinobutyrophenone.

Example 4: Semi-IPN Solid Polymer Electrolyte Precursor 102 with Cellulose Acetate Propionate (CAP), Polymerizable Oligomer, and Silica A cellulose ester solution was prepared by dissolving, under agitation, cellulose acetate propionate (CAP, 16.30 g) in dimethylformamide (83.7 g). After full dissolution, a second solution was prepared by combining the first cellulose ester solution (16.3%, 31.18 g) with poly(ethylene glycol) 200 diacrylate (SR 259, 1.45 g), alkoxylated pentaerythritol tetraacrylate (SR 494, 0.73 g), polycaprolactone triol (Mw=300, 0.72 g), and 1-methoxy-2-propanol (11.25 g). The solution was homogenized via agitation. Separately, lithium iodide (0.24 g) was combined with fumed silica (0.22 g), and this solid mixture was homogenized to disperse the silica particles. The solid mixture (0.46 g) was combined with 4.54 g of the second solution above and homogenized via agitation.

The weight percentages of components in this example precursor composition were 10.2% CAP, 4.8% LiI, 2.9% SR 259, 1.5% SR 494, 1.4% poly(caprolactone triol), 0.1% 2-benzyl-2-(dimethylamino)-4'-morpholinobutyrophenone, 22.5% 1-methoxy-2-propanol, 52.2% dimethylformamide, and 4.4% silica. In the dry-down form, the weight percentages of components in this example precursor composition were 40.2% CAP, 19.1% LiI, 11.5% SR 259, 5.7% SR 494, 5.7% polycaprolactone triol, 0.5% 2-benzyl-2-(dimethylamino)-4'-morpholinobutyrophenone, and 17.2% of silica.

Example 5: Semi-IPN Nanocomposite Solid Polymer Electrolyte Precursor Composition with Cellulose Acetate Propionate (CAP), Polymerizable Oligomer, and Alumina A cellulose ester solution was prepared by dissolving, under agitation, cellulose acetate propionate (CAP, 16.30 g) in dimethylformamide (83.7 g). Separately, lithium iodide (1.10 g) was combined with alumina (1.00 g), and the resulting solid mixture was homogenized to disperse the alumina particles. The cellulose ester solution (16.3%, 3.12 g) was combined with poly(ethylene glycol) 200 diacrylate (SR 259, 0.14 g), alkoxylated pentaerythritol tetraacrylate (SR 494, 0.07 g), polycaprolactone triol (Mw=300 0.04 g), 2-benzyl-2-(dimethylamino)-4'-morpholinobutyrophenone (0.06 g), the solid mixture of lithium iodide and alumina (0.46 g), and 1-methoxy-2-propanol (1.19 g). The slurry was homogenized via agitation.

The weight percentages of components in this example precursor composition were 10.1% CAP, 4.8% LiI, 2.9% SR 259, 1.4% SR 494, 0.8% poly(caprolactone triol), 0.1% 2-benzyl-2-(dimethylamino)-4'-morpholinobutyro-phenone, 23.7% 1-methoxy-2-propanol, 51.8% dimethylformamide, and 4.4% alumina. In the dry-down form, weight percentages are as follows: 41.2% CAP, 19.6% LiI, 11.8% SR 259, 5.9% SR 494, 3.1% polycaprolactone triol, 0.5% 2-benzyl-2-(dimethylamino)-4'-morpholinobutyrophenone, and 17.9% of alumina.

Example 6: Semi-IPN Nanocomposite Solid Polymer Electrolyte Precursor Composition with Cellulose Acetate Propionate, Polymerizable Oligomer, Titania, and Alumina A cellulose ester solution was prepared by dissolving, under agitation, cellulose acetate propionate (CAP, 16.30 g) in dimethylformamide (83.7 g). After full dissolution, a second solution was prepared by combining the first cellulose ester solution (16.3%, 31.18 g) with poly(ethylene glycol) 200 diacrylate (SR 259, 1.45 g), alkoxylated pentaerythritol tetraacrylate (SR 494, 0.73 g), polycaprolactone triol, Mw=300 (0.72 g), 2-benzyl-2-(dimethylamino)-4'-morpholinobutyrophenone (0.06 g), and 1-methoxy-2-propanol (11.25 g). The solution was homogenized via agitation. Separately, lithium iodide (0.24 g) was combined with alumina (0.11 g) and titania (0.11 g). The resulting solid mixture was homogenized to disperse these particles. The second solution (4.54 g) was added to the solid mixture of lithium iodide, alumina, and titania (0.46 g), added. The resulting slurry was homogenized under agitation.

The weight percentages of components in this example precursor composition were 10.2% CAP, 4.8% LiI, 2.9% SR 259, 1.5% SR 494, 1.4% poly(caprolactone triol), 0.1% 2-benzyl-2-(dimethylamino)-4'-morpholinobutyro-phenone, 22.5% 1-methoxy-2-propanol, 52.2% dimethylformamide, 2.2% alumina and 2.2% titania. In the dry-down form, the weight percentages of components in this example were 40.2% CAP, 19.1% LiI, 11.5% SR 259, 5.7% SR 494, 5.7% polycaprolactone triol, 0.5% 2-benzyl-2-(dimethylamino)-4'-morpholinobutyrophenone, 8.6% alumina, and 8.6% titania.

Example 7: Semi-IPN Nanocomposite Solid Polymer Electrolyte Precursor Composition with Cellulose Acetate Propionate, Polymerizable Oligomer, and Titania A cellulose ester solution was prepared by dissolving, under agitation, cellulose acetate propionate (16.30 g) in dimethylformamide (83.7 g). After full dissolution, a second solution was prepared by combining the first cellulose ester solution (16.3%, 31.18 g) with poly(ethylene glycol), diacrylate (SR 259, 1.45 g), alkoxylated pentaerythritol tetraacrylate (SR 494, 0.73 g), polycaprolactone triol (Mw=300 (0.72 g), 2-benzyl-2-(dimethylamino)-4'-morpholinobutyrophenone (0.06 g), and 1-methoxy-2-propanol (11.25 g). The solution was homogenized under agitation. Separately, lithium iodide (0.24 g) was combined with titania (0.22 g), and the resulting solid mixture was homogenized to disperse particles. The second solution (4.54 g) was added to the solid mixture of lithium iodide and titania (0.46 g). The slurry was homogenized via agitation.

The weight percentages of components in this example precursor composition were 10.2% CAP, 4.8% LiI, 2.9% SR 259, 1% SR 494, 1.4% poly(caprolactone triol), 0.1% 2-benzyl-2-(dimethylamino)-4'-morpholinobutyro-phenone, 22.5% 1-methoxy-2-propanol, 52.2% dimethylformamide, and 4.4% titania. In the dry-down form, the weight percentages of components in this example precursor composition were 40.2% CAP, 19.1% LiI, 11.5% SR 259, 5.7% SR 494, 5.7% polycaprolactone triol, 0.5% 2-benzyl-2-(dimethylamino)-4'-morpholinobutyro-phenone, and 17.2% of titania.

Example 8: Semi-IPN Nanocomposite Solid Polymer Electrolyte Precursor Composition with Cellulose Acetate Propionate, Polymerizable Oligomer, Titania, and Bis(2-ethylhexyl Adipate) as Plasticizer A cellulose ester solution was prepared by dissolving, under agitation, cellulose acetate propionate (12.23 g) in 1-methoxy-2-propanol (87 g). After full dissolution, bis(2-ethylhexyl) adipate (0.80 g) was added to the solution, and the solution was homogenized via agitation. A second solution was prepared by combining the first cellulose ester solution (12.2%, 32.60 g) with poly(ethylene glycol) 200 diacrylate (SR 259, 1.20 g), alkoxylated pentaerythritol tetraacrylate (SR 494, 0.6 g), and diethylene glycol monoethyl ether acetate (4.80 g). The solution was homogenized via agitation. Separately, a third cellulose ester solution was prepared by dissolving, under agitation, cellulose acetate propionate (3.10 g) in 1-methoxy-2-propanol (96.90 g). After full dissolution, titania (3.00 g) was combined with the third cellulose ester solution (9.68 g) and 1-methoxy-2-propanol (4.00 g). The resulting slurry was homogenized with agitation to disperse the particles. Lithium iodide (0.24 g) was combined with titania (0.22 g), and the resulting solid mixture was homogenized to disperse the particles. Separately, the titania slurry (0.57 g), the second solution (2.00), lithium iodide (0.21 g), and a 5% solution of 2-benzyl-2-

(dimethylamino)-4'-morpholinobutyrophenone in acetone (0.06 g) were combined. The resulting slurry was homogenized via agitation.

The weight percentages of components in this example precursor composition were 7.2% CAP, 0.5% bis(2-ethylhexyl) adipate, 7.3% LiI, 2.2% SR 259, 1.1% SR 494, 0.1% 2-benzyl-2-(dimethylamino)-4'-morpholinobutyrophenone, 3.6% titania, 67.5% 1-methoxy-2-propanol, 8.7% diethylene glycol monoethyl ether acetate, and 1.9% acetone. In the dry-down form, the weight percentages of components in this example were 32.7% CAP, 2.1% bis(2-ethylhexyl) adipate, 33.2% LiI, 10.0% SR 259, 5.0% SR 494, 0.4% 2-benzyl-2-(dimethylamino)-4'-morpholinobutyrophenone, and 16.6% of titania.

Example 9: Preparation and Ionic Conductivity Testing of Semi-IPN Solid Polymer Electrolyte The precursor compositions of the examples above were coated on aluminum substrates to obtain corresponding semi-IPN solid polymer electrolyte films. Prior to coating the films, the substrates were immersed in a 5 weight % KOH aqueous solution for 30 seconds, rinsed with water three times, rinsed with isopropanol, and dried. The precursor compositions were blade-coated onto the surface of the cleaned aluminum foil at different wet coverages to give dry film thickness in a range from about 75 µm to 150 µm. Each coating was dried at 100° C. for five minutes before being exposed to UV light using a Xe—Hg 1000 W lamp for 15 seconds under nitrogen or argon flow to photopolymerize the polymerizable components (e.g., acrylates). The samples were then dried and annealed at temperatures of 100° C. to 150° C. for one to two hours to obtain dry semi-IPN solid polymer electrolyte films.

Typically, the dry semi-IPN solid polymer electrolyte films included 25-60 weight % of the polymer component 104 of FIG. 1, 2-7 weight % of the plasticizer(s) 112 of FIG. 1, 20-35 weight % of the lithium salts and/or complexes 108 of FIG. 1, 10-25 weight % of polymerizable components 106 (or byproducts thereof), 10-25 weight % of ceramic particles 116 of FIG. 1, and 1-5 weight % of photo-initiators 114 of FIG. 1 (or byproducts thereof).

The ionic conductivities of the example semi-IPN solid polymer electrolyte films were tested by disposing (e.g., sandwiching) the film between two aluminum electrodes and recording electrochemical impedance spectra at an alternating current (AC) voltage of 10 mV and a frequency sweep from 1 MHz to 1 mHz. Ionic conductivity values (a) were determined from measured impedance values (R) in the plateau region of Bode plots based on:

$$\sigma\left(\frac{S}{cm}\right) = \frac{l}{A \cdot R}$$

where l is the thickness of the film and A is the contact area of the film. Ionic conductivities were determined at room temperature (e.g., at about 25° C.).

Figure 4:
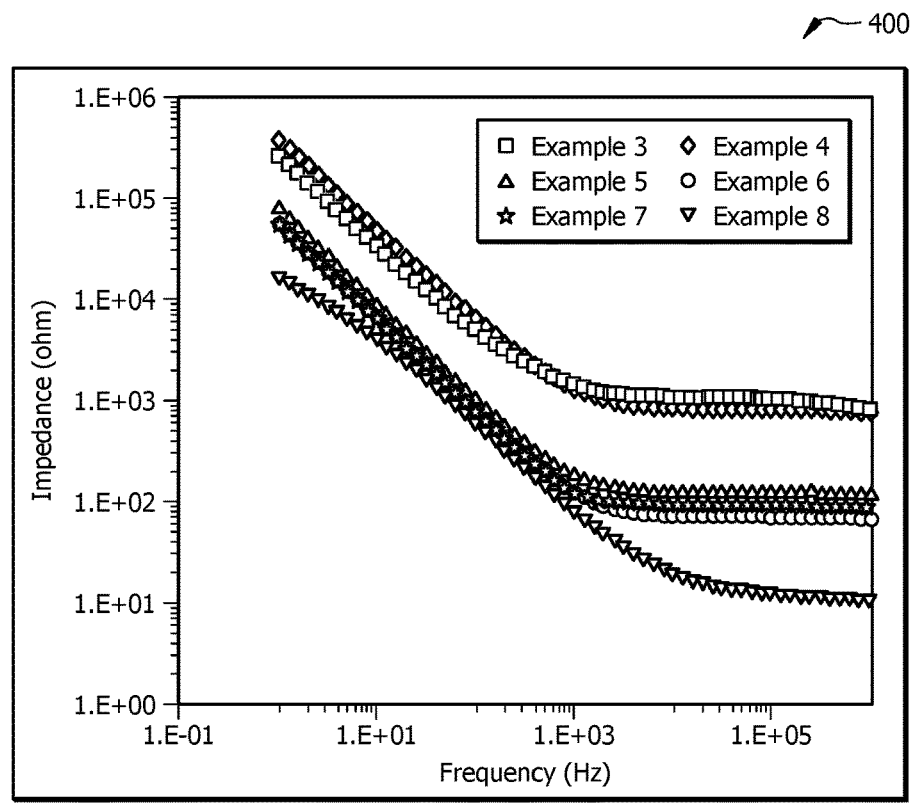
FIG. 4 is a Bode plot of impedance versus frequency response for cells with a semi-interpenetrating network solid polymer electrolyte films prepared using different precursor compositions.

FIG. 4 shows Bode plots 400 for cells comprising the semi-IPN SPEs prepared using the different precursor compositions of Examples 3 through 8, described above.

TABLE 2 below shows ionic conductivities determined for different example solid polymer electrolyte films described above. The information in TABLE 2 demonstrates the improved ionic conductivity was achieved through inclusion of ceramic particles in the electrolyte precursor. Each of the solid polymer electrolyte films prepared from the precursors from examples 4-7 with ceramic particles had an increased ionic conductivity compared to that of the solid polymer electrolyte film prepared from the precursor from example 3, which lacked ceramic particles.

TABLE 2

Example impact of ceramic particles on ionic conductivity

|  | Example 3 | Example 4 | Example 5 | Example 6 | Example 7 |
|---|---|---|---|---|---|
| Ceramic particle type | None | $SiO_2$ | $Al_2O_3$ | $Al_2O_3$ & $TiO_2$ | $TiO_2$ |
| SR 259 diacrylate (wt %) | 14.3 | 11.5 | 11.8 | 11.5 | 18.0 |
| SR 494 tetraacrylate (wt %) | 7.2 | 5.7 | 5.9 | 5.7 | 9.0 |
| Irgacure 369 (wt %) | 0.6 | 0.5 | 0.5 | 0.5 | 0.5 |
| CAP-482-20 (wt %) | 50.2 | 40.2 | 41.2 | 40.2 | 63.0 |
| Poly(caprolactone) triol (wt %) | 3.8 | 5.7 | 3.1 | 5.7 | 9.0 |
| LiI (wt %) | 23.9 | 19.1 | 19.6 | 19.1 | 23.0 |
| Ceramic Particles (wt %) | 0.0 | 17.2 | 17.9 | 17.2 (8.6 each) | 21.0 |
| Thickness (µm) | 140 | 172 | 175 | 77 | 139 |
| Ionic Conductivity (S/cm) | $1 \times 10^{-5}$ | $2 \times 10^{-5}$ | $2 \times 10^{-4}$ | $1 \times 10^{-4}$ | $1.5 \times 10^{-4}$ |

TABLE 3 below shows ionic conductivities determined for example solid polymer electrolyte films described above with different types of plasticizers. The information in TABLE 3 demonstrates the improved ionic conductivity achieved through inclusion of bis(2-ethylhexyl) adipate as the plasticizer in place of polycaprolactone triol.

TABLE 3

Example impact of plasticizer on ionic conductivity

|  | Example 7 Polycaprolactone triol | Example 8 bis(2-ethylhexyl) adipate |
|---|---|---|
| SR 259 diacrylate (wt %) | 18.0 | 10 |
| SR 494 tetraacrylate (wt %) | 9.0 | 5 |

TABLE 3-continued

Example impact of plasticizer on ionic conductivity

| | Example 7 Polycaprolactone triol | Example 8 bis(2-ethylhexyl) adipate |
|---|---|---|
| Irgacure 369 (wt %) | 0.5 | 0.4 |
| CAP-482-20 (wt %) | 63.0 | 32.7 |
| Plasticizer (wt %) | 9.0 | 2.1 |
| LiI (wt %) | 23.0 | 33.2 |
| TiO2 (wt %) | 21.0 | 16.6 |
| Thickness (μm) | 139 | 94 |
| Ionic Conductivity (S/cm) | $1 \times 10^{-4}$ | $7 \times 10^{-4}$ |

Example 10: Dynamic Mechanical Analysis of Semi-IPN Solid Polymer Electrolyte

Figure 5:
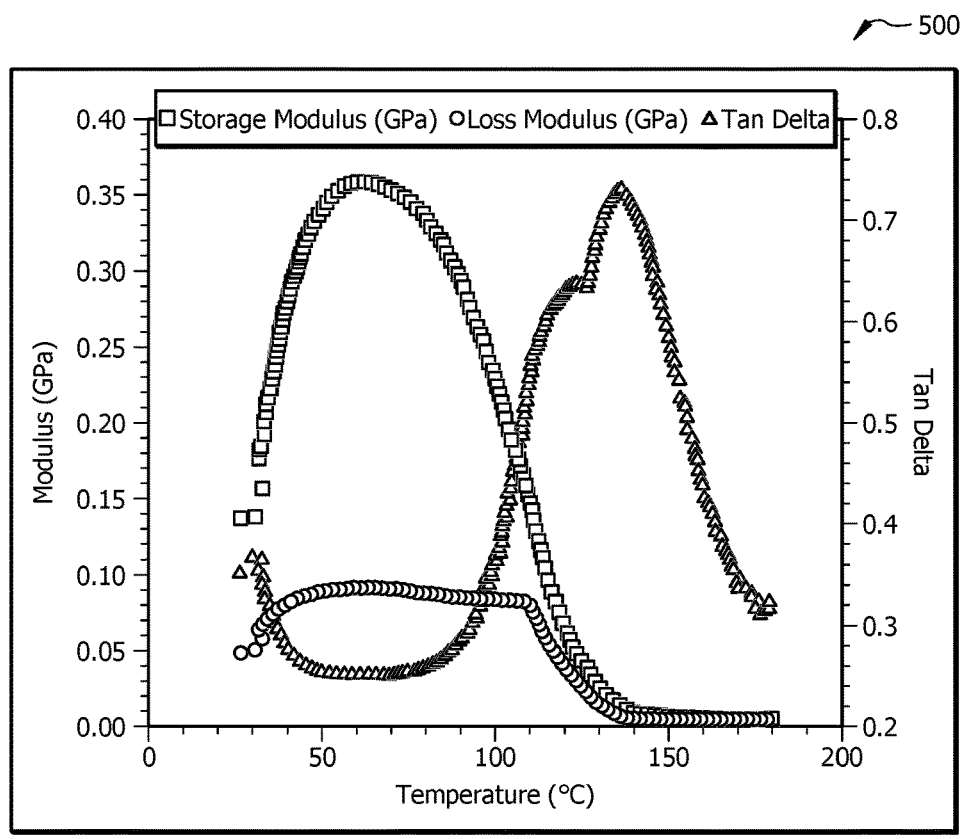
FIG. 5 is a plot of dynamic mechanical analysis tests for an example solid polymer electrolyte film.

The mechanical and thermal properties of the example semi-IPN solid polymer electrolyte films were tested by dynamic mechanical analysis (DMA) under tension with a temperature sweep of 2° C./min, at a frequency of 1 Hz (6.28 rad/s), at a strain of 0.4%, and at an applied force of 3.0 grams. FIG. 5 shows a plot 500 of the DMA data for semi-IPN SPEs prepared using the precursor compositions of Examples 1 through 8. As shown in FIG. 5, the solid polymer electrolyte described in this disclosure has a high glass transition temperature of 135° C., which makes these semi-IPN SPEs suitable for high temperature applications. Furthermore, the semi-IPN SPEs exhibits a storage modulus of about 0.45 GPa, which is useful for a solid polymer electrolyte film.

Modifications, additions, or omissions may be made to the systems, apparatuses, and methods described herein. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better explain the disclosure and does not pose a limitation on the scope of claims.

What is claimed is:

1. A solid polymer electrolyte comprising:
a cellulosic polymer matrix, the cellulosic polymer matrix comprising a network of a cellulosic polymer;
lithium ions dispersed in the cellulosic polymer matrix;
ceramic particles dispersed in the cellulosic polymer matrix, wherein the ceramic particles comprise a metal oxide;
one or more plasticizers dispersed in the cellulosic polymer matrix; and
one or more polymer networks in contact with the cellulosic polymer matrix, the one or more polymer networks comprising a cross-linked acrylate-containing polymer, further comprising 25% to 60% by weight of the cellulosic polymer matrix, 10% to 25% percent by weight of the acrylate-containing polymer, 20% to 35% percent by weight of a source of the lithium ions, 2% to 7% percent by weight of the one or more plasticizers, and 10% to 25% percent by weight of the ceramic particles.

2. The solid polymer electrolyte claim 1, further comprising one or more vinylic-backbone polymers dispersed in or in contact with the cellulosic polymer matrix, the one or more vinylic-backbone polymers comprising a vinylic backbone and a molecular weight less than 100,000 grams per mole.

3. The solid polymer electrolyte of claim 1, wherein an ionic conductivity of the solid polymer electrolyte is at least $1 \times 10^{-4}$ Siemens per centimeter.

4. The solid polymer electrolyte of claim 1, wherein the ceramic particles comprise nanoparticles of one or more of a titanium oxide, an aluminum oxide, a silicon oxide, a zirconium oxide, a tin oxide, a tungsten oxide, and a tantalum oxide.

5. The solid polymer electrolyte of claim 1, wherein the cellulosic polymer of the cellulosic polymer matrix comprises one or more of cellulose ester, cellulose acetate, and cellulose acetate propionate.

6. The solid polymer electrolyte of claim 1, further compromising one or more lithium ion sources selected from the group consisting of lithium nitrate (LiNO3), lithium iodide (LiI), lithium sulfide ($Li_2S$), lithium perchlorate ($LiClO_4$), lithium trifluoromethanesulfonate ($LiCF_3SO_3$), lithium hexafluoroarsenate(V) ($LiAsF_6$), lithium hexafluorophosphate ($LiPF_6$), and lithium tetrafluoroborate ($LiBF_4$).

* * * * *